J. FISHER.
DRAINING DEVICE FOR MOTOR VEHICLE RADIATORS, ETC.
APPLICATION FILED FEB. 8, 1922.

1,424,636.

Patented Aug. 1, 1922.

Inventor
Jack Fisher
By Davis & Davis
Attorneys

UNITED STATES PATENT OFFICE.

JACK FISHER, OF BUFFALO COUNTY, NEBRASKA.

DRAINING DEVICE FOR MOTOR-VEHICLE RADIATORS, ETC.

1,424,636. Specification of Letters Patent. Patented Aug. 1, 1922.

Application filed February 8, 1922. Serial No. 535,020.

*To all whom it may concern:*

Be it known that I, JACK FISHER, a citizen of the United States of America, and a resident of the county of Buffalo (R. F. D. Ravenna) and State of Nebraska, have invented certain new and useful Improvements in Draining Devices for Motor-Vehicle Radiators, Etc., of which the following is a full and clear specification.

The pet-cock for draining motor-vehicle radiators is invariably located on the underside of the radiator. In this position it is difficult to get at it for turning the plug, especially in view of the fact that the plug frequently sticks hard enough to require the application of a tool. The object of my invention is to provide a simple appliance whereby the plug of the cock may be turned from a convenient point at the side of the vehicle, and the construction of my device is such that it lends itself nicely to manufacture and sale as an accessory, i. e., a device adapted for sale separately from the vehicle, to be applied to the vehicle by the purchaser.

In the drawing—

Figure 1:
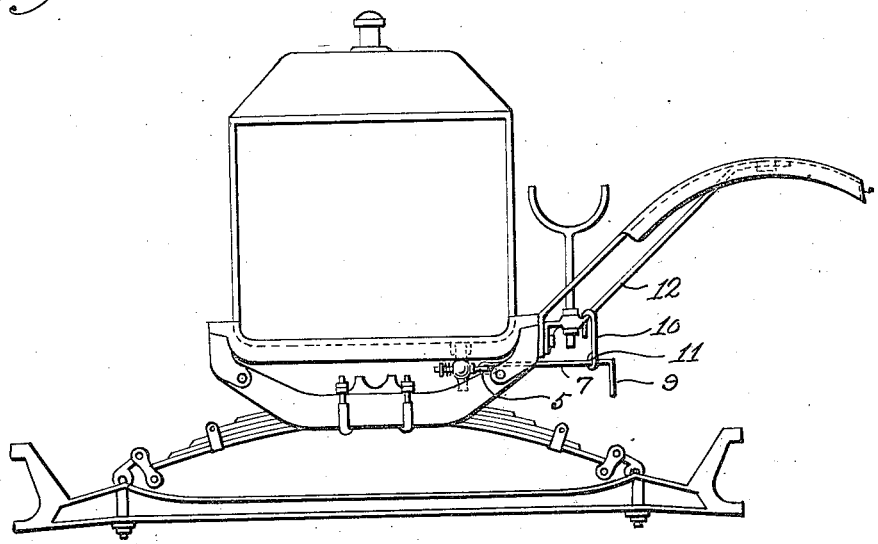
Fig. 1 is an end view of a part of a motor vehicle showing my appliance attached thereto.
Figure 2:
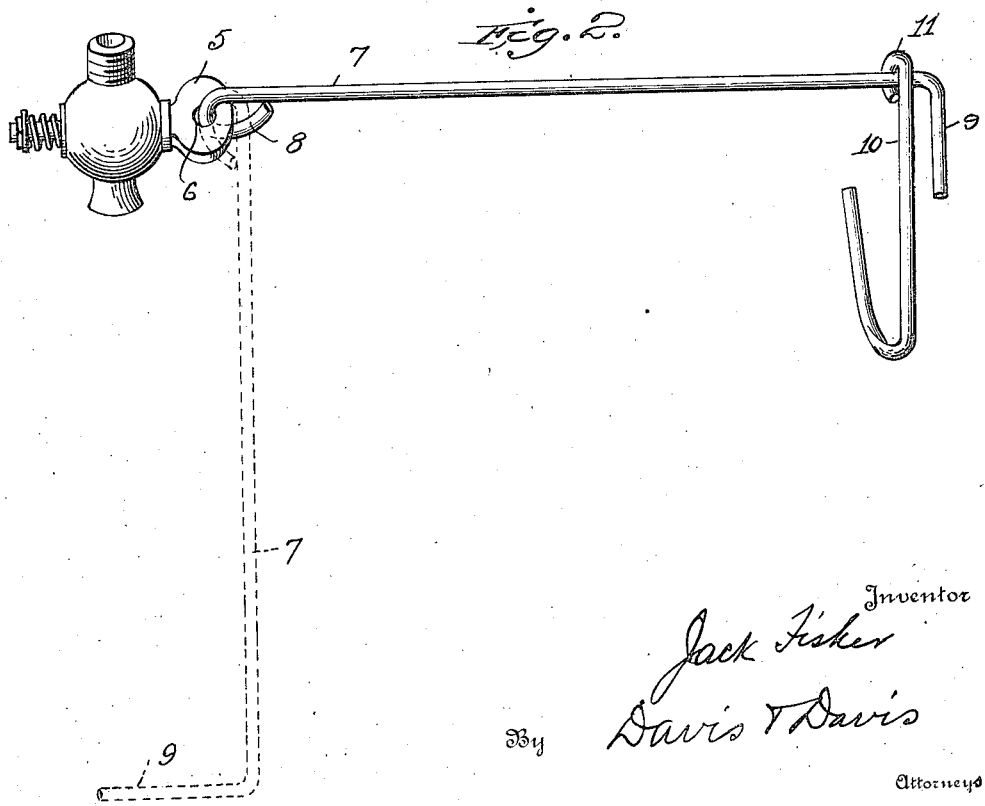
Fig. 2 is a perspective view of my appliance detached.

In the drawing, 5 designates the usual pet-cock-plug, which is provided with a hole 6 in its usual flattened finger-piece. Hooked into this hole 6 is the inner end of a rod 7, the connection being by means of an eye 8 formed by bending over the end of the rod, this connection being desirable not only because of simplicity, but because it permits the rod or shaft to have a limited universal movement with regard to the plug.

The outer end of the rod is formed into a crank-handle 9, the rod being long enough to extend to a point under one of the adjacent front fenders, where the crank may be reached with ease, so that by means of the shaft the plug may be opened and closed without reaching in under the radiator. The outer end of the shaft is supported by means of a hook 10 formed of a piece of wire bent to form an open hook at one end and a closed eye 11 at the other end, the eye forming a journal for the shaft 7. The hooked end of the hook is hung over a convenient part of the vehicle, preferably one of the brace-rods 12 of the front fender, where both the hook and the crank 9 will be out of the way. The hook is slidable upon the shaft, to enable it to be adjusted to different cars and different parts of the car, and, by reason of the loose joint between the shaft 7 and the plug 5, the shaft is capable of being inclined upwardly or downwardly or laterally to enable the hook to be engaged with a convenient part of the vehicle. The shaft may be rotated with the hook in position or the hook may be disconnected from the vehicle and the shaft thus rotated without a supporting bearing at its outer end.

The eye 8, connecting the shaft with the finger-piece of the pet-cock, constitutes a universal joint; this is advantageous in that, as stated, the shaft 7 may be rotated at various angles with reference to the axis of the plug of the cock, and it is also advantageous, as will be seen, in that it enables the shaft to hang at an angle to the plug, thereby permitting considerable latitude in hanging the hook 10 to a convenient part of the vehicle. It will be understood also that my device is applicable to tractor radiators as well as transmission casings of both passengers cars and tractors.

I do not desire to be understood as limiting myself to the precise details of construction and arrangement shown, as variations and modifications therefrom may be made without departing from the spirit and scope of my invention and improvements. I therefore reserve the right to all such variations and modifications as properly fall within the scope of my invention and improvements and the terms of the following claim.

What I claim is:

In combination with a motor car having a depending drain-cock located within the bounds of the chassis, a shaft connected to the plug of the cock by a universal joint and extending outwardly beyond the chassis and provided at its outer end with a crank for rotating it, and a hanger at the outer end of the shaft consisting of an open hook slidably mounted on the shaft between the crank and the universal joint.

In testimony whereof I hereunto affix my signature.

JACK FISHER.